US011579947B2

(12) United States Patent
Hamze et al.

(10) Patent No.: US 11,579,947 B2
(45) Date of Patent: Feb. 14, 2023

(54) UNIVARIATE DENSITY ESTIMATION METHOD

(71) Applicant: Microsoft Technology Licensing, LLC, Redmond, WA (US)

(72) Inventors: Firas Hamze, Vancouver (CA); Helmut Gottfried Katzgraber, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 17/069,755

(22) Filed: Oct. 13, 2020

(65) Prior Publication Data

US 2022/0050731 A1 Feb. 17, 2022

Related U.S. Application Data

(60) Provisional application No. 63/064,173, filed on Aug. 11, 2020.

(51) Int. Cl.
| | |
|---|---|
| *G06F 9/54* | (2006.01) |
| *G06V 10/75* | (2022.01) |
| *G06K 9/62* | (2022.01) |
| *G06F 9/38* | (2018.01) |

(52) U.S. Cl.
CPC ............ *G06F 9/545* (2013.01); *G06F 9/3836* (2013.01); *G06K 9/6277* (2013.01); *G06V 10/758* (2022.01)

(58) Field of Classification Search
CPC ..... G06F 9/545; G06V 10/758; G06K 9/6277
USPC ........................................................ 719/314
See application file for complete search history.

(56) References Cited

U.S. PATENT DOCUMENTS

2021/0003973 A1* 1/2021 Chakrabarty ........ G06K 9/6271

OTHER PUBLICATIONS

Brent, Richard P., "Algorithms for Minimization Without Derivatives", Published by Dover Publications, Jun. 10, 2013, 6 Pages.
Greengard, et al., "The Fast Gauss Transform", In SIAM Journal on Scientific and Statistical Computing, vol. 12, Issue 1, Jan. 1991, pp. 79-94.
Hjort, et al., "Nonparametric Density Estimation with a Parametric Start", In Proceedings of Annals of Statistics, vol. 23, Issue 3, Jun. 1995, pp. 882-904.

(Continued)

*Primary Examiner* — Jeffery A Williams
(74) *Attorney, Agent, or Firm* — Alleman Hall Creasman & Tuttle LLP

(57) ABSTRACT

A method for use with a computing device. The method may include receiving a data set including a plurality of univariate data points and determining a target kernel bandwidth for a kernel density estimator (KDE). Determining the target kernel bandwidth may include computing a plurality of sample KDEs and selecting the target kernel bandwidth based on the sample KDEs. The method may further include computing the KDE for the data set using the target kernel bandwidth. For one or more tail regions of the data set, the method may further include computing one or more respective tail extensions. The method may further include computing and outputting a renormalized piecewise density estimator that, in each tail region, equals a renormalization of the respective tail extension for that tail region, and, outside the one or more tail regions, equals a renormalization of the KDE.

20 Claims, 13 Drawing Sheets

(56) References Cited

OTHER PUBLICATIONS

Jones, et al., "Kernel Density Estimation on Positive Data via the logKDE Package for R", Retrieved From: https://cran.r-project.org/web/packages/logKDE/vignettes/logKDE.pdf, Jul. 31, 2018, 26 Pages.
Silverman, B.W., "Density Estimation For Statistics and Data Analysis", In Proceedings of Publication of CRC Press, vol. 26, Apr. 1986, 22 Pages.
"International Search Report and Written Opinion Issued in PCT Application No. PCT/US2021/032238", dated Aug. 19, 2021, 16 Pages.
"Piecewise Distribution with Pareto Tails", Retrieved From: https://web.archive.org/web/20180814193512/https://www.mathworks com/help/stats/paretotails.html, Aug. 14, 2018, 4 Pages.
Mahdhi, et al., "A Prediction-Based VM Consolidation Approach in IaaS Cloud Data Centers", In Journal of Systems and Software, vol. 146, Dec. 1, 2018, pp. 263-285.
Charpentier, et al., "Log-Transform Kernel Density Estimation of Income Distribution", In Journal of SSRN Electronics, Jan. 1, 2015, pp. 141-159.

\* cited by examiner

UNIVARIATE DENSITY ESTIMATION METHOD

CROSS REFERENCE TO RELATED APPLICATIONS

This application claims priority to U.S. Provisional Patent Application Ser. No. 63/064,173, filed Aug. 11, 2020, the entirety of which is hereby incorporated herein by reference for all purposes.

BACKGROUND

Kernel density estimation (KDE) is a technique for approximating an unknown distribution f(x) from a set of N samples $\{x^{(1)}, \ldots, x^{(N)}\}$. The estimators are given by the equation $$\hat{f}(x; h) = \frac{1}{N}\sum_{i=1}^{N} K_h(x, x^{(i)})$$

where $K_h(\bullet,\bullet)$ is a kernel function selected to provide a smooth alternative to a histogram-based estimator. h is a kernel bandwidth which may be selected to determine an amount of smoothing that is performed on the samples. In some examples, the kernel function may be a Gaussian kernel function given by the following equation:

$$K_\sigma(x, y) = \frac{1}{2\pi\sigma} e^{-\frac{1}{2\sigma^2}(x-y)^2}$$

Other kernel functions may alternatively be used.

When KDE is used, there may be a tradeoff between variance and bias of the estimator $\hat{f}(x; h)$. In addition, as N increases, the smoothness of the estimator may also increase. Thus, when N is increased, a lower value of h may be used to obtain an estimator with the same level of smoothness. KDE is a nonparametric technique that does not require setting any parameters of the estimator based on assumptions made about the properties of the distribution. Thus, KDE may be used for a wide variety of types of distribution.

SUMMARY

According to one aspect of the present disclosure, a method for use with a computing device is provided. The method may include receiving a data set including a plurality of univariate data points. The method may further include determining a target kernel bandwidth for a kernel density estimator (KDE). Determining the target kernel bandwidth may include computing, for the data set, a plurality of sample KDEs with a respective plurality of candidate kernel bandwidths. Determining the target kernel bandwidth may further include selecting the target kernel bandwidth based at least in part on the sample KDEs. The method may further include computing the KDE for the data set using the target kernel bandwidth. For one or more tail regions of the data set, the method may further include computing one or more respective tail extensions. The method may further include computing a renormalized piecewise density estimator that, in each tail region of the one or more tail regions, equals a renormalization of the respective tail extension for that tail region, and, outside the one or more tail regions, equals a renormalization of the KDE. The method may further include outputting the renormalized piecewise density estimator.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Although KDE has the advantage of being usable with a wide variety of distribution types, KDE also has some disadvantages compared to parametric methods of approximating unknown distributions. First, KDE may converge more slowly than parametric models. When KDE is used, the integrated mean squared error of the estimator relative to the true distribution decreases with $N^{-4/5}$, whereas the integrated mean squared error of a parametric estimator may decrease with $N^{-1}$. The error of the KDE estimator may also increase exponentially as the dimensionality of the samples increases.

In addition, the error of the KDE estimator may increase rapidly outside the range of the samples. This deterioration in the accuracy of the estimator may be more pronounced when a heavy-tailed distribution is sampled. A heavy-tailed distribution is a distribution in which the density in extremal portions of the domain decreases more slowly than an exponential function. Heavy-tailed phenomena occur in a variety of scientific, financial, and engineering domains in which large, atypical outcomes are observed with frequencies greater than those predicted with Gaussian modeling distributions. For example, the sizes of stock market crashes, insurance claims, file sizes transferred over a network, and earthquakes may exhibit heavy-tailed distributions. A KDE estimator computed using a Gaussian kernel may systematically underestimate the density of a heavy-tailed distribution outside the sampling range.

Techniques for performing univariate density estimation are provided below. When these density estimation techniques are used, the error of the estimator may decrease more quickly as a function of N compared to the error of the KDE estimator. In addition, using the techniques discussed below, density in the tails of heavy-tailed distributions may be estimated more accurately while maintaining accuracy in the central portion of the distribution.

Figure 1A:
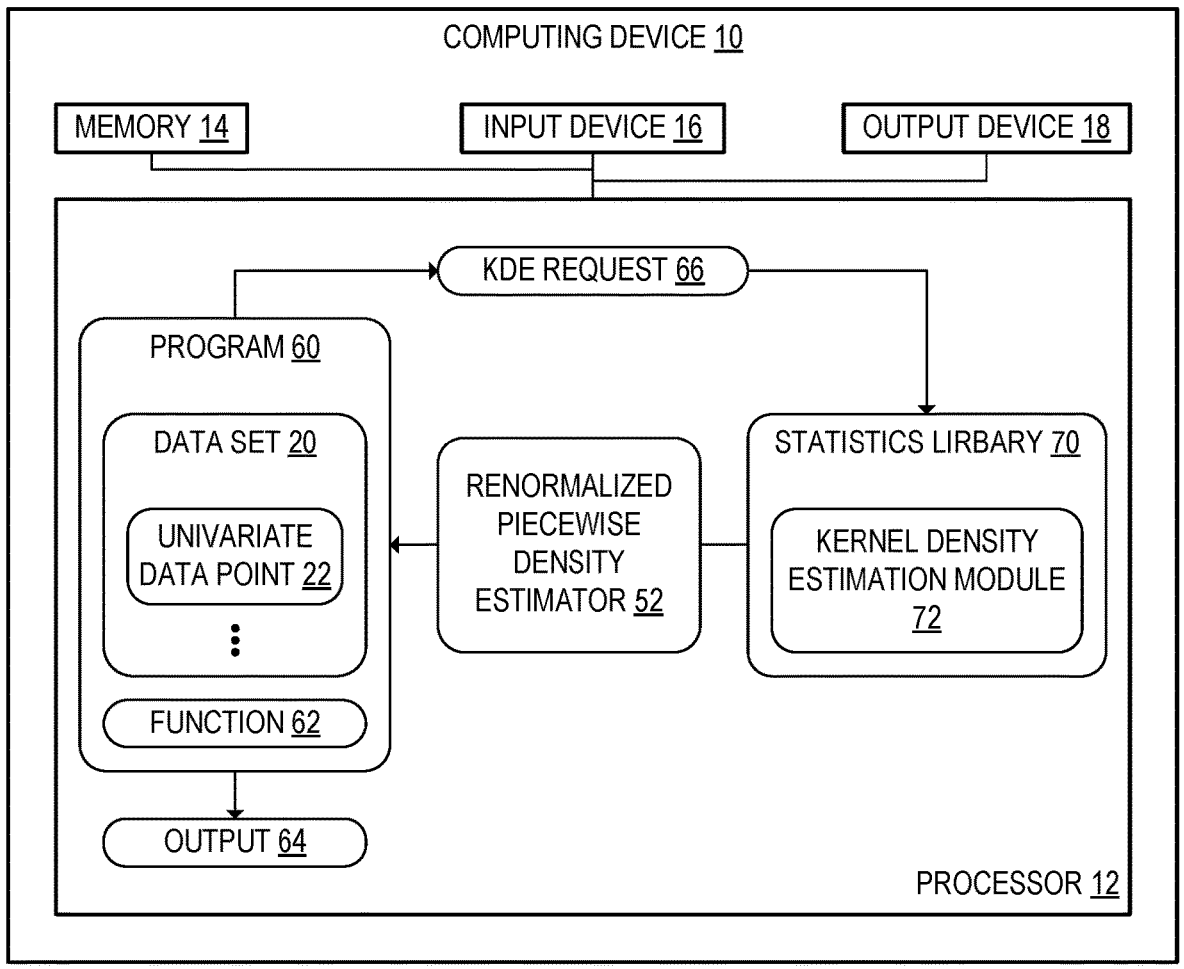
FIG. 1A schematically shows an example computing device including a processor configured to compute a renormalized piecewise density estimator, according to one example embodiment.

FIG. 1A schematically depicts an example computing device 10 configured to compute a density estimate. As shown in FIG. 1A, the computing device 10 may include a processor 12 and memory 14. The memory 14 may include volatile memory and/or non-volatile memory. In addition, the computing device 10 may include one or more input devices 16 and one or more output devices 18. The computing device 10 may be configured to receive input from a user or one or more other computing devices via the one or more input devices 16. In addition, the computing device 10 may be configured to present outputs to a user or transmit outputs to the one or more other computing devices via the one or more output devices 18. The computing device 10 may be implemented as a single physical computing device or as a plurality of physical computing devices configured to communicate with each other.

The processor 12 may be configured to receive a data set 20 including a plurality of univariate data points 22. The plurality of univariate data points 22 may be received from another computing device or entered by the user at the one or more input devices 16. As shown in the example of FIG. 1A, the data set 20 may be received at a program 60 executed by the processor 12. The program 60 may be further configured to convey a KDE request 66 to a statistics library 70 executed by the processor 12. The statistics library 70 may include one or more modules via which statistical properties of the data set 20 may be computed. The one or more modules included in the statistics library 70 may include a kernel density estimation module 72 at which the processor 12 may be configured to compute a renormalized piecewise density estimator 52 for the data set 20.

The renormalized piecewise density estimator 52 may be conveyed to the program 60, at which the renormalized piecewise density estimator 52 may be used as an input for one or more functions 62 of the program 60 to generate one or more outputs 64. For example, the program 60 may be a program configured to use a probability distribution for measured values of an observable of a quantum-mechanical system in order to perform error detection at a quantum computing device. As another example, the function 60 may be a bandwidth allocation program for a data center that uses, as an input, a probability distribution of file sizes for incoming or outgoing files.

Figure 1B:
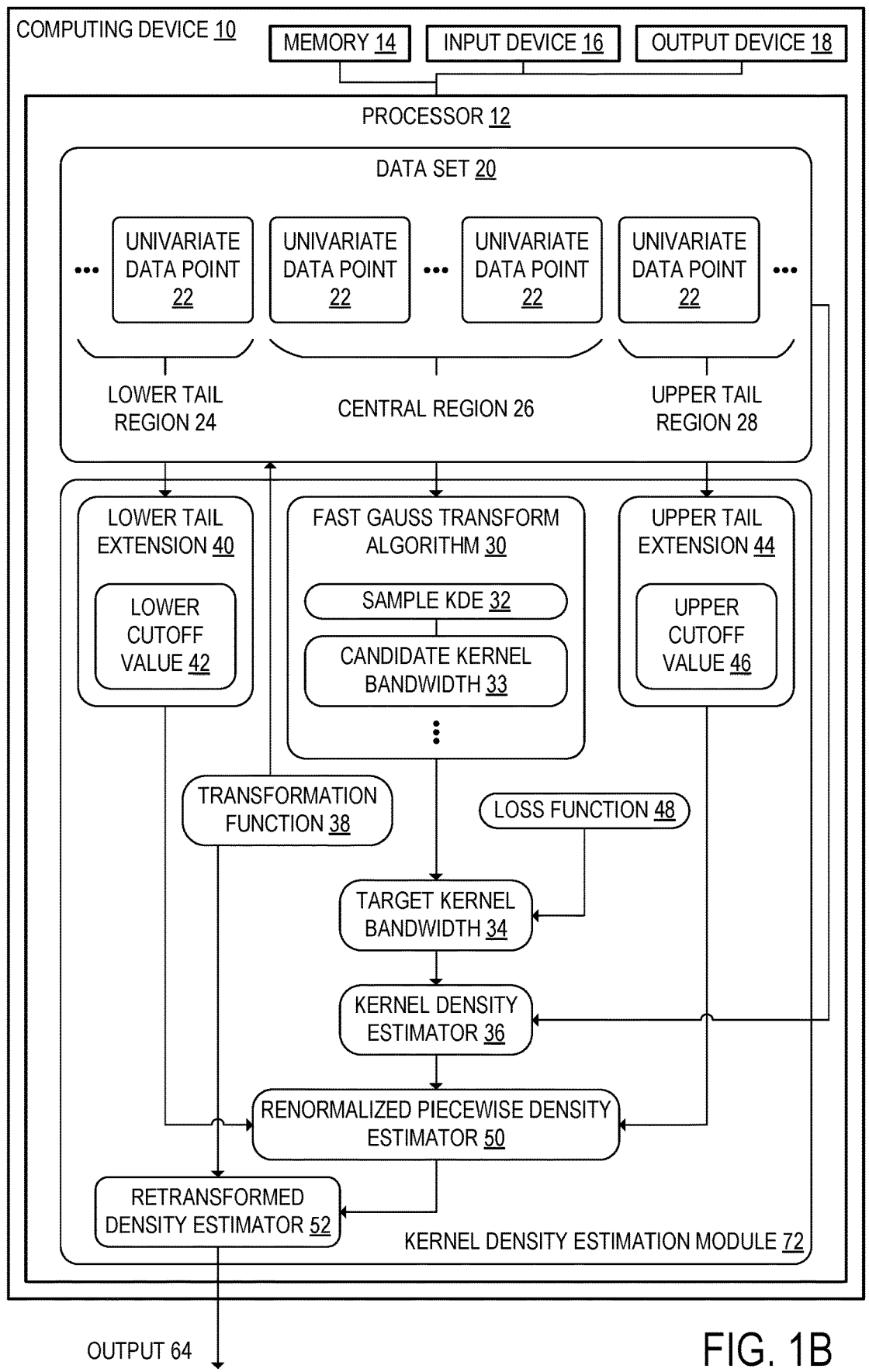
FIG. 1B shows the computing device of FIG. 1A in additional detail when the computing device executes a kernel density estimation module.

FIG. 1B shows the processor 12 of the computing device 10 in further detail when the kernel density estimation module 72 is executed. In some examples, when the kernel density estimation module 72 is executed, the processor 12 may be further configured to apply a transformation function 38 to the univariate data points 22. The transformation function 38 may be an invertible function. In some examples, the transformation function 22 may change the domain within which the plurality of univariate data points 22 are distributed.

The processor 12 may be further configured to determine a target kernel bandwidth 34 for a KDE 36. For example, when the kernel function is a Gaussian kernel function, the target kernel bandwidth may be a value of a in the equation for a Gaussian kernel shown above. Determining the target kernel bandwidth 34 may include computing, for the data set 20, a plurality of sample KDEs 32 with a respective plurality of candidate kernel bandwidths 33. The processor 12 may be further configured to select the target kernel bandwidth 34 based at least in part on the sample KDEs 32. Each sample KDE 32 may be computed using a fast Gauss transform algorithm 30, as discussed in further detail below.

In examples in which determining the target kernel bandwidth 34 includes computing a plurality of sample KDEs, the target kernel bandwidth 34 may be computed via leave-one-out cross-validation (LOOCV) at least in part by performing gradient descent on respective a loss function 48 for each candidate kernel bandwidth 34 of the plurality of candidate kernel bandwidths 34. Each loss function 48 may, for example, be a log loss function. Performing LOOCV may further include, for each candidate kernel bandwidth 34, computing a plurality of leave-one-out density estimates with the candidate kernel bandwidth 34 for the plurality of univariate data points 22. Each leave-one-out density estimate may be a KDE computed with one univariate data point 22 of the data set 20 excluded. In such examples, the processor 12 may be further configured to evaluate the loss function based on the plurality of leave-one-out density estimates. Thus, the processor 12 may be configured to determine a plurality of values of the loss function 48 for respective values of the kernel bandwidth over which gradient descent may be performed. After the target kernel bandwidth 34 has been selected, the processor 12 may be further configured to compute the KDE 36 for the data set 20 using the target kernel bandwidth 34.

For one or more tail regions of the data set 20, the processor 12 may be further configured to compute one or more respective tail extensions. As shown in the example of FIG. 1B, the one or more tail regions may include a lower tail region 24 including each univariate data point 22 with a value below a lower cutoff value 42. In addition, the one or more tail regions may include an upper tail region 28 including each univariate data point 22 with a value above an upper cutoff value 46. The univariate data points 22 located between the lower cutoff value 42 and the upper cutoff value 46 may be located in a central region 26 of the data set 20. Each tail extension may be equal to the KDE 36 at the boundary between the tail region and the central region. In addition, the derivative of the tail extension may be equal to the derivative of the KDE 36 at the boundary of the tail region.

Figure 2:
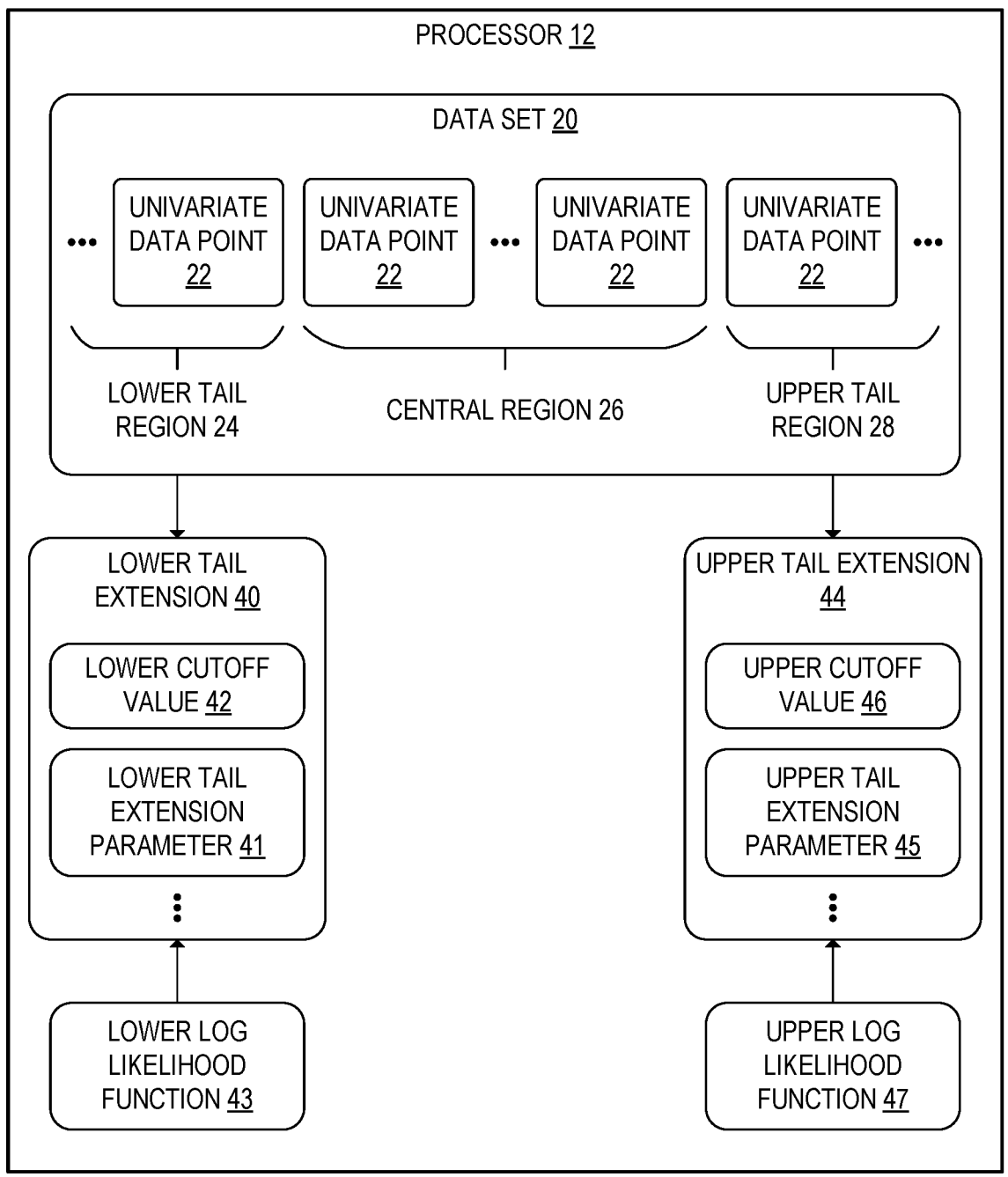
FIG. 2 schematically shows the processor of the computing device of FIG. 1A when a lower tail extension and an upper tail extension are computed.

FIG. 2 schematically shows the processor 12 of the computing device 10 when a lower tail extension 40 and an upper tail extension 44 are computed for the lower tail 24 and the upper tail 28 of the data set 20. As shown in the example of FIG. 2, the lower tail extension 40 may have one or more lower tail extension parameters 41 in addition to the lower cutoff value 42, and the upper tail extension 44 may have one or more upper tail extension parameters 45 in addition to the upper cutoff value 46, as discussed in further detail below. The one or more lower tail extension parameters 41 and the one or more upper tail extension parameters 45 may be determined by the processor 12 when the lower tail extension 40 and the upper tail extension 44 are computed. In some examples, for each tail extension of the one or more tail extensions, the processor 12 may be configured to estimate a maximum value of a log likelihood function of one or more tail extension parameters. FIG. 8 shows a lower log likelihood function 43 for the first tail region 24 and an upper log likelihood function 47 for the upper tail region 28. In other examples, some likelihood function other than a log likelihood function may be used.

Returning to FIG. 1B, the processor 12 may be further configured to compute a renormalized piecewise density estimator 50 based on the KDE 36 and the one or more tail extensions. In each tail region of the one or more tail regions, the renormalized piecewise density estimator 50 may equal a renormalization of the respective tail extension for that tail region. In the central region 26 located outside the one or more tail regions, the renormalized piecewise density estimator 50 may equal a renormalization of the KDE 36. Computing the renormalized piecewise density estimator 50 may include computing a piecewise density estimator and a renormalization constant by which the processor 12 may be configured to divide the piecewise density estimator. The renormalization constant may be equal to the definite integral of the piecewise density estimator over its domain.

The processor 12 may be further configured to convey the renormalized piecewise density estimator 50 for output at an output device 16 of the one or more output devices 16. The renormalized piecewise density estimator 50 may be transmitted to another computing device and/or presented to the user, such as via a display or a speaker. In some examples, the renormalized piecewise density estimator 50 may be used as an input for another computing process executed at the computing device 10.

In examples in which the processor 12 applies a transformation function 38 to the univariate data points 22 prior to determining the target kernel bandwidth 34, the processor 12 may be further configured to compute a retransformed density estimator 52 by multiplying the renormalized piecewise density estimator 50 by an absolute value of a derivative of the transformation function 38. The processor 12 may be further configured to convey the retransformed density estimator 52 for output. The retransformed density estimator 52 may be output in addition to, or alternatively to, the renormalized piecewise density estimator 50.

Figure 3A:
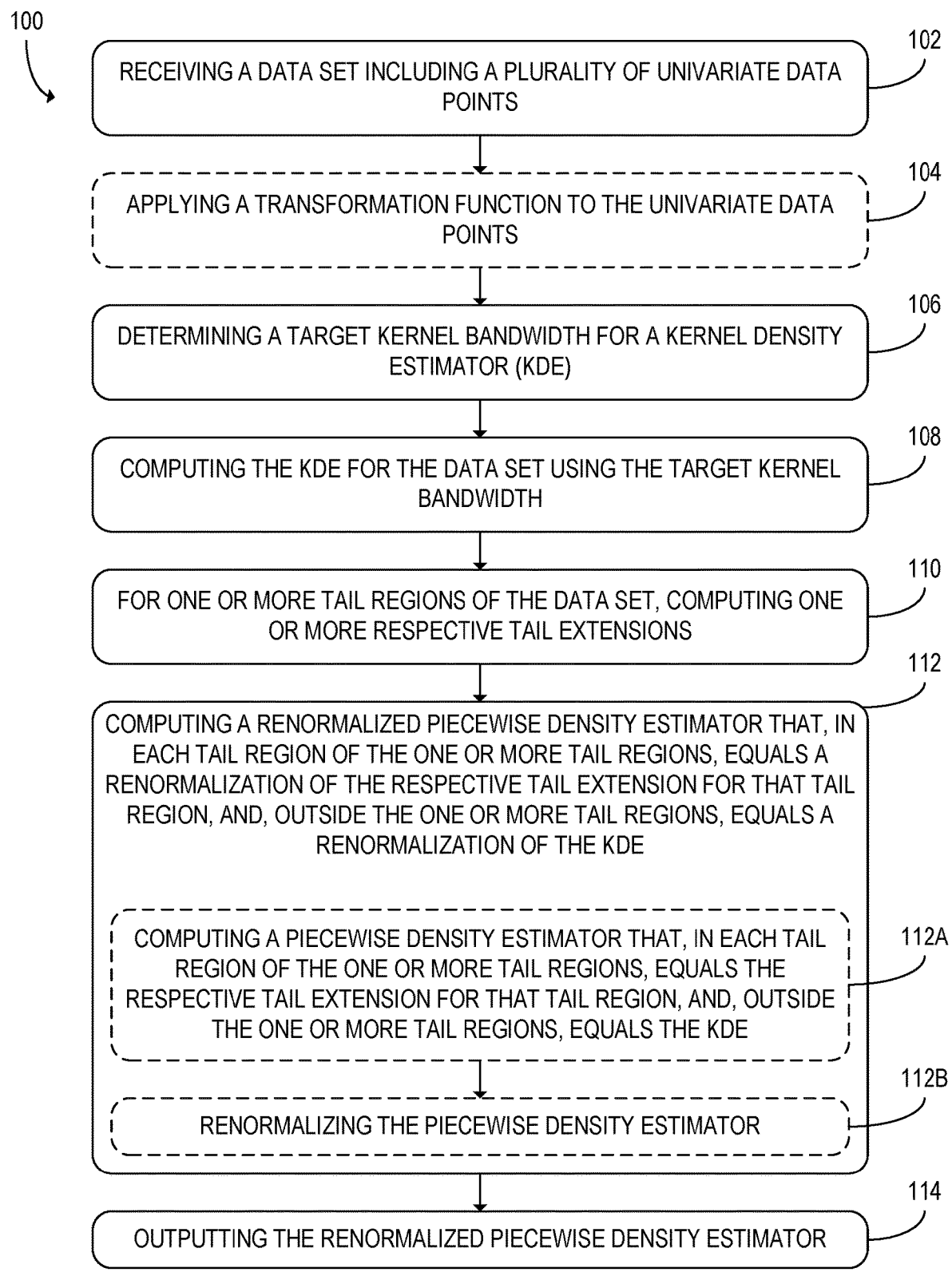
FIG. 3A shows a flowchart of an example method of univariate density estimation for use with a computing device, according to embodiment of FIG. 1A.

A flowchart of an example method 100 for univariate density estimation is shown in FIG. 3A. The method 100 of FIG. 3A may be used with the computing device 10 of FIG. 1A or with some other computing device. The method 100 may have three main stages, each of which is discussed in further detail below. In the first stage, a data transformation may be performed on the samples. The data transformation may, for example, map the samples onto the domain of real numbers or a finite interval of real numbers. In the second stage, leave-one-out cross-validation may be performed with respect to a log loss of the estimator in order to determine the KDE bandwidth. A fast Gauss transform algorithm may be used when LOOCV is performed. The fast Gauss transform algorithm may reduce the computational complexity of computing the KDE bandwidth from $O(N^2)$ to $O(N)$ with low approximation error. In the third stage, a pair of cutoff points may be selected, and upper and lower tail extensions may be computed. The tail extensions may be used instead of KDE to determine the density of the distribution outside the interval bounded by the cutoff points. In addition, the overall distribution including the KDE and the tail extensions may be renormalized.

At step 102, the method 100 may include receiving a data set including a plurality of univariate data points. For example, the data set may be received as a vector of numerical values.

In the first stage, the method 100 may include, at step 104, applying a transformation function to the univariate data points. The transformation function used in the first stage may be an invertible function that is applied to each of the data points $x^{(i)}$ included in the data set. Density estimation may then be performed on the transformed variates in the second and third stages. After the density estimate has been computed, the density estimate may be re-expressed over the original variable via a change in measure. Performing the data transformation may prevent an increase in the error of the estimator that would occur when applying KDE to a set of samples that have a bounded domain. In addition, performing the data transformation may transform a heavy-tailed distribution into a light-tailed distribution. For example, performing a log transformation of a set of Pareto-distributed or log-normal-distributed variates may respectively result in exponentially distributed variables and Gaussian-distributed variables, neither of which is heavy-tailed.

The data transformation function may be defined as $Y=T(x)$. For example, the data transformation function $T(X)=\log(X)$ may be applied to the data points when the values of the data points are positive. From the transformed data points, a transformed distribution estimator $\hat{f}_Y(y)$ of the transformed distribution $f_Y(y)$ may be computed. The following equation may be used to determine an estimator $\hat{f}_X(x)$ of the original distribution $f_X(x)$:

$$\hat{f}_X(x) = \hat{f}_Y(x)) |T'(x)|$$

In examples in which the density of a two-tailed heavy-tailed distribution is estimated, a two-sided analysis may be performed, in which the above process of computing $\hat{f}_X(x)$ may be applied separately for data above a boundary value and data below the boundary value. In such examples, the final estimator may be given by a convex combination of the upper-region estimator and the lower-region estimator. The boundary value may, for example, be a median value of the samples. In other examples, some value other than the median value may be used as a boundary between the upper region and the lower region. For example, the boundary between the upper region and the lower region may be zero. This two-sided analysis may be performed when the set of data points includes negative values. In addition, two-sided analysis may be performed for super-heavy-tailed distributions that are still heavy-tailed after a log transformation. Two-sided analysis may be performed for a super-heavy-tailed distribution, such as a log-Cauchy distribution, after at least a first log transformation has already been applied to the distribution. The transformed data points for such a distribution may have negative values after the first log transformation is applied. Thus, a two-sided analysis with a boundary value of zero may be applied to the log-transformed super-heavy-tailed distribution.

As another example of a transformation function T(X), the following transformation function may be applied to data that are bounded to the range [a, b]:

$$T(X) = logit\left(\frac{X-a}{b-a}\right)$$

where $$logit(t) \triangleq \log\frac{t}{1-t}$$

This transformation function maps the interval [a, b] to the real numbers.

Figure 3B:
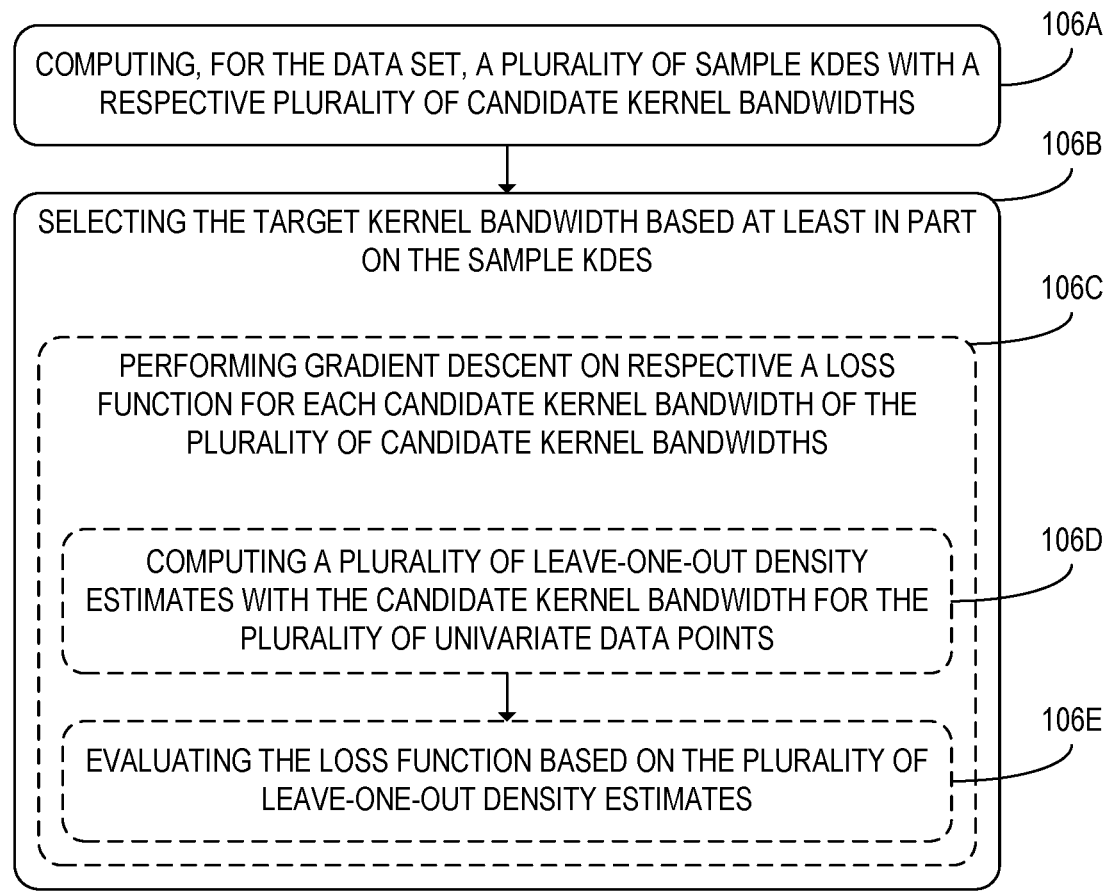
FIGS. 3B-3C show additional steps of the method of FIG. 3A that may be performed in some examples when determining a target kernel bandwidth.

In the second stage of the univariate density estimation, the method 100 may further include, at step 106, determining a target kernel bandwidth $\sigma^*$ for a kernel density estimator (KDE). FIG. 3B shows additional steps of the method 100 that may be performed in some examples when performing step 106. In the example of FIG. 3B, the target kernel bandwidth is computed via LOOCV. As shown at step 106A, computing the target kernel bandwidth may include computing, for the data set, a plurality of sample KDEs with a respective plurality of candidate kernel bandwidths. Each sample KDE is a KDE computed for the data set with a candidate value for the target kernel bandwidth. The plurality of sample KDEs may be computed using a fast Gauss transform algorithm in some examples. Determining the target kernel bandwidth may further include, at step 106B, selecting the target kernel bandwidth based at least in part on the sample KDEs.

In some examples, as shown at step 106C, selecting the target kernel bandwidth based at least in part on the sample KDEs may include performing gradient descent on a respective loss function for each candidate kernel bandwidth of the plurality of candidate kernel bandwidths. In examples in which step 106C are performed, performing gradient descent for each candidate kernel bandwidth may include, at step 106D, computing a plurality of leave-one-out density estimates with the candidate kernel bandwidth for the plurality of univariate data points. Performing gradient descent for each candidate kernel bandwidth may further include, at step 106E, evaluating the loss function based on the plurality of leave-one-out density estimates. The loss function may, for example, be a log loss function.

The process of determining the target kernel bandwidth is now discussed in additional detail. When the Gaussian kernel $K_\sigma(x,y)$ is computed, each data point contributes to the value of the Gaussian kernel for any point x. Thus, computing the estimator $$\tilde{f}(x;\sigma) = \frac{1}{N}\sum_{i=1}^{N}K_\sigma(x,x^{(i)})$$

at a set of M target points is an operation of cost O(MN). As discussed below, the O(MN) cost of computing $\tilde{f}(x;\sigma)$ implies that performing LOOCV to select the target kernel bandwidth for a collection of N data points has a cost of $O(N^2)$ operations for each candidate kernel bandwidth $\sigma$. Thus, for large values of N, performing a search over a plurality of values of $\sigma$ may be impractical.

Performing LOOCV with respect to the log loss $L_X(\sigma)$ is the problem of computing the target kernel bandwidth $$\sigma^* = \underset{\sigma>0}{\mathrm{argmin}} L_X(\sigma)$$

where the log loss is given by the equation $$L_X(\sigma) = -\sum_{i=1}^{N}\log\tilde{f}_{(-i)}(x^{(i)};\sigma)$$

In the above equation for the log loss, $\tilde{f}_{(-i)}(x^{(i)};\sigma)$ is the KDE resulting from leaving out the ith data point:

$$\tilde{f}_{(-i)}(x;\sigma) = \frac{1}{N-1}\sum_{j\neq i}K_\sigma(x,x^{(j)})$$

Thus, naïve calculation of $L_X(\sigma)$ includes N computations of a KDE constructed using N−1 data points, resulting in a cost of $O(N^2)$ operations for each value of $L_X(\sigma)$.

Since computing the exact value of $L_X(\sigma)$ may be more computationally expensive than would be practical, a fast Gauss transform (FGT) algorithm may instead be used to estimate $L_X(\sigma)$. The FGT algorithm is an algorithm for computing sums of the form $$g(y) = \sum_{i=1}^{N}q_i e^{-\frac{1}{2\sigma^2}(y-x_i)^2}$$

At a set of M target points. In the above equation, $x_i$ are a set of N source points with respective source weights $q_i$. Performing the FGT algorithm includes representing the Gaussian kernel in terms of a Hermite expansion about the centers of a set of source grids. Performing the FGT algorithm further includes collecting source points within the grid regions into one effective Hermite expansion. The FGT algorithm reduces the cost of computing g(y) from O(MN) to O(M+N) while incurring a quantifiable error.

The FGT algorithm uses a fixed set of source points $x_i$, whereas each computation of a value of $\tilde{f}_{(-i)}(x;\sigma)$ leaves out a data point. The left-out density estimate for the ith data point may be filled in according to the following equation:

$$\tilde{f}_{(-i)}(x^{(i)};\sigma) = \frac{1}{N-1}\sum_{j\neq i}\frac{1}{\sqrt{2\pi}\sigma}e^{-\frac{1}{2\sigma^2}(x^{(i)}-x^{(j)})^2}$$

-continued $$= \frac{1}{N-1}\left[\sum_{i=1}^{N}\frac{1}{\sqrt{2\pi}\sigma}e^{-\frac{1}{2\sigma^2}(x^{(i)}-x^{(j)})^2} - \frac{1}{\sqrt{2\pi}\sigma}\right]$$

$$= \frac{N}{N-1}\tilde{f}(x^{(i)};\sigma) - \frac{1}{\sqrt{2\pi}\sigma(N-1)}$$

Thus, the left-out density estimate is an affine-transformed version of the density estimate for $x^{(i)}$ that is computed with all the data points.

Evaluating $L_X(\sigma)$ may accordingly include computing $\tilde{f}(x^{(i)};\sigma)$ for $i=\{1,\ldots,N\}$ at a cost of O(N). Evaluating $L_X(\sigma)$ may further include computing $\tilde{f}_{(-i)}(x^{(i)};\sigma)$ using the computed value of $\tilde{f}(x^{(i)};\sigma)$ according to the above equation. Computing $\tilde{f}_{(-i)}(x^{(i)};\sigma)$ from $\tilde{f}(x^{(i)};\sigma)$ may also have a cost of O(N). $L_X(\sigma)$ may then be evaluated by inputting the values of $\{\tilde{f}_{(-i)}\}$ into the definition of $L_X(\sigma)$. The overall cost of computing $L_X(\sigma)$ may therefore be reduced from $O(N^2)$ to O(N). The reduction in computing cost that results from using the FGT algorithm may allow $L_X(\sigma)$ to be computed for values of N that would have prohibitively high computational costs if the naïve algorithm for computing $L_X(\sigma)$ were used.

Estimating the target bandwidth $\sigma^*$ may include a plurality of computations of $L_X(\sigma)$. For example, $\sigma^*$ may be computed using a bracketing and bisection search. Alternatively, $\sigma^*$ may be computed using Brent's method, which includes performing the secant method under quadratic interpolation. Computing $\sigma^*$ using Brent's method may include approximately half as many computations of $L_X(\sigma)$ compared to bracketing and bisection search. In other examples, other search techniques may be used when estimating $\sigma^*$.

Returning to FIG. 3A, at step 108, the method 100 may further include computing the KDE for the data set using the target kernel bandwidth. The KDE for the transformed data $\{y^{(1)},\ldots,y^{(N)}\}$ may be computed with the following equation:

$$\tilde{f}_0(y;\sigma^*) = \frac{1}{\sqrt{2\pi}\sigma^*N}\sum_{i=1}^{N}e^{-\frac{1}{2\sigma^{*2}}(y-y^{(i)})^2}$$

At step 110, the method 100 may further include computing one or more respective tail extensions for one or more tail regions of the data set. In the examples provided below, the one or more tail regions include a lower tail region and an upper tail region. However, in other examples, one or more intermediate regions of the data set may be treated as tail regions and estimated using one or more respective tail extension functions rather than with the KDE. For example, an extension may be computed for an intermediate region when the distribution includes one or more asymptotes or other boundary conditions in the one or more intermediate regions, or when the data points are sparsely distributed in the one or more intermediate regions. In other examples, a tail extension may be computed for only one tail of a distribution rather than both an upper tail and a lower tail.

When the upper tail region and the lower tail region are identified, maximum and minimum transformed data values may be computed:

$$y_{max} = \max_i\{y^{(i)}\}$$

$$y_{min} = \min_i\{y^{(i)}\}$$

Upper and lower cutoff points $y_u<y_{max}$ and $y_l>y_{min}$ for the tails of the distribution may be selected. The lower tail region may include each univariate data point with a value below the lower cutoff value. In addition, the upper tail region may include each univariate data point with a value above the upper cutoff value. In some examples, $y_l$ and $y_u$ may be selected using cross-validation or some other data-dependent technique. Alternatively, a predetermined cutoff level $\alpha$ may be set, and $y_l$ and $y_u$ may be defined as the $\lfloor N\alpha \rfloor^{th}$ and $\lceil N(1-\alpha) \rceil^{th}$ data order statistics respectively, where $\lfloor x \rfloor$ is the floor function and $\lceil x \rceil$ is the ceiling function. An upper tail set and a lower tail set of the transformed data points may be respectively defined as follows:

$$Y_u = \{y^{(i)} | y^{(i)} > y_u\}$$

$$Y_l = \{y^{(i)} | y^{(i)} < y_l\}$$

The upper tail set includes each transformed data point in the transformed distribution that is above the upper cutoff point, and the lower tail set includes each transformed data point in the transformed distribution that is below the lower cutoff point.

A lower tail extension and an upper tail extension of the KDE for the transformed data set may be defined as follows:

$$\tilde{f}_l(y;\theta_l) = e^{a_0 + a_1(y_l-y) + a_2(y_l-y)^p}$$

$$\tilde{f}_u(y;\theta_u) = e^{b_0 + b_1(y-y_u) + b_2(y-y_u)^q}$$

The tail extensions have the parameter vectors $$\theta_l = (a_0, a_1, a_2, p)$$

$$\theta_u = (b_0, b_1, b_2, q)$$

These parameter vectors may have $a_1$, $a_2$, $b_1$, $b_2 \leq 0$ in order to preserve integrability. In addition, the parameter vectors may have p, q>1. In one example, the above form of the upper tail extension may be used to represent the upper tail of a Pareto distribution when the transformation function is a log transformation and $b_2=0$. As another example, when $b_2 \neq 0$ and q=2, the above form of the upper tail extension may be used to represent a log-normal upper tail of untransformed data (i.e. the set of transformed data points when the transformation function is the identity transformation T(x)=x).

The above forms of the lower and upper tail extensions may maintain continuity and smoothness of the KDE by matching the function value and derivative of $\tilde{f}_0(y;\sigma^*)$ at the cutoff points. To determine higher-order terms of the tail extensions, maximum likelihood estimation may be performed on the transformed data points included in $Y_u$ and $Y_l$, as discussed below. Smoothness and continuity conditions may be enforced in order to determine the remaining parameters included in $\theta_l$ and $\theta_u$.

Fitting the lower tail extension to $\tilde{f}_0(y;\sigma^*)$ may include computing the values of parameters $a_0^*$ and $a_1^*$ with which $\tilde{f}_l(y;\theta_l)$ may be computed when the kernel bandwidth is the target bandwidth $\sigma^*$. The value of $\tilde{f}_0(y;\sigma^*)$ at the lower cutoff point $y_l$ may be matched by setting $$a_0^* = \log \tilde{f}_0(y_l;\sigma^*)$$

In addition, the derivative of $\tilde{f}_0(y;\sigma^*)$ at the lower cutoff point may be matched by setting $$a_1^* = -\frac{\tilde{f}_0'(y_l;\sigma^*)}{\tilde{f}_0(y_l;\sigma^*)}$$

Thus, for each tail extension of the one or more tail extensions, the tail extension may be equal to the KDE at the boundary of the tail region. In addition, the derivative of the tail extension may be equal to the derivative of the KDE at the boundary of the tail region.

With the above values of $a_0^*$ and $a_1^*$ held fixed, maximum likelihood estimation may then be performed over the lower tail extension to determine $a_2^*$ and $p^*$:

$$a_2^*, p^* = \arg\max_{a_2,p} L_l(a_0^*, a_1^*, a_2, p)$$

where $L_l$ is a log likelihood function $$L_l(\theta_l) = \sum_{y \in Y_l} \log \tilde{f}_l(y; \theta_l)$$

Similarly, upper tail parameters $b_0^*$, $b_1^*$, $b_2^*$, $q^*$ that fit the upper tail extension to $\tilde{f}_0(y;\sigma^*)$ may be computed. $b_0^*$ and $b_1^*$ may be computed as follows:

$$b_0^* = \log \tilde{f}_0(y_u;\sigma^*)$$

$$b_1^* = \frac{\tilde{f}_0'(y_u;\sigma^*)}{\tilde{f}_0(y_u;\sigma^*)}$$

With the above values of $b_0^*$ and $b_1^*$ held fixed, maximum likelihood estimation may then be performed over the upper tail extension to determine $b_2^*$ and $q^*$:

$$b_2^*, q^* = \arg\max_{b_2,q} L_u(b_0^*, b_1^*, b_2, q)$$

where $L_u$ is a log likelihood function $$L_u(\theta_u) = \sum_{y \in Y_u} \log \tilde{f}_u(y; \theta_u)$$

Thus, both the lower tail extension and the upper extension may be matched to the central KDE $\tilde{f}_0(y;\sigma^*)$.

Computing the parameter values that maximize the log likelihood functions $L_l(\theta_l)$ and $L_u(\theta_u)$ may, in some examples, include computing the gradients $\nabla L_l(\theta_l)$ and $\nabla L_u(\theta_u)$ of the log likelihood functions. The partial derivatives of $L_l(\theta_l)$ with respect to $a_2$ and $p$ may be computed using the following equations:

$$\frac{\partial L_l}{\partial a_2} = \sum_{y \in Y_l} (y_l - y)^p - \frac{|Y_l|}{Z_l(\theta_l)} \int_{-\infty}^{y_l} (y_l - y')^p \tilde{f}_l(y'; \theta_l) dy' \frac{\partial L_l}{\partial p} =$$

-continued $$\sum_{y \in Y_l} a_2 \log(y_l - y)(y_l - y)^p - \frac{|Y_l|}{Z_l(\theta_l)} \int_{-\infty}^{y_l} \log(y_l - y)(y_l - y')^p \tilde{f}_l(y'; \theta_l) dy'$$

The integrals included in the above equations for the partial derivatives of $L_l(\theta_l)$ may be computed numerically. In order to ensure integrability, $a_2$ may be bounded to be less than zero, and $p$ may be bounded to be greater than one. After $\nabla L_l(\theta_l)$ has been computed, $L_l(\theta_l)$, $\nabla L_l(\theta_l)$, $a_2 < 0$, and $p > 1$ may be used as inputs for a numerical optimization method such as a bound-constrained quasi-Newton method to determine $a_2^*$ and $p^*$.

At step 112, the method 100 may further include computing a renormalized piecewise density estimator. The renormalized piecewise density estimator may, in each tail region of the one or more tail regions, equal a renormalization of the respective tail extension for that tail region. Outside the one or more tail regions, the renormalized piecewise density estimator may equal a renormalization of the KDE. In some examples, step 112 may include, at step 112A, computing a piecewise density estimator. In each tail region of the one or more tail regions, the piecewise density estimator may equal the respective tail extension for that tail region. In the central region located outside the one or more tail regions, the piecewise density estimator may equal the KDE. The FGT algorithm may be used to compute the KDE $\tilde{f}_0(y;\sigma^*)$ when the piecewise density estimator is computed. In such examples, step 112 may further include, at step 112B, renormalizing the piecewise density estimator such that the renormalized piecewise density estimator has a definite integral of 1 over its domain. Computing the renormalized piecewise density estimator may include computing a renormalization constant Z. When Z is computed, estimates of the following integrals may be numerically computed:

$$Z_l(\theta_l^*) = \int_{-\infty}^{y_l} \tilde{f}_l(y;\theta_l^*) dy$$

$$Z_0 = \int_{y_l}^{y_u} \tilde{f}_0(y;\sigma^*) dy$$

$$Z_u(\theta_u^*) = \int_{y_u}^{\infty} \tilde{f}_u(y;\theta_u^*) dy$$

The renormalization constant Z may be defined as:

$$Z = Z_l(\theta_l^*) + Z_0 + Z_u(\theta_u^*)$$

Thus, the renormalized piecewise density estimator over Y may then be computed as:

$$\hat{f}_Y(y) = \begin{cases} \dfrac{\tilde{f}_l(y;\theta_l^*)}{Z}, & y < y_l \\ \dfrac{\tilde{f}_0(y;\sigma^*)}{Z}, & y_l \leq y \leq y_u \\ \dfrac{\tilde{f}_u(y;\theta_u^*)}{Z}, & y > y_u \end{cases}$$

Thus, the KDE and each tail estimator may be divided by the renormalization constant Z to obtain the renormalized piecewise density estimator. At step 114, the method 100 may further include outputting the renormalized piecewise density estimator.

Figure 3C:
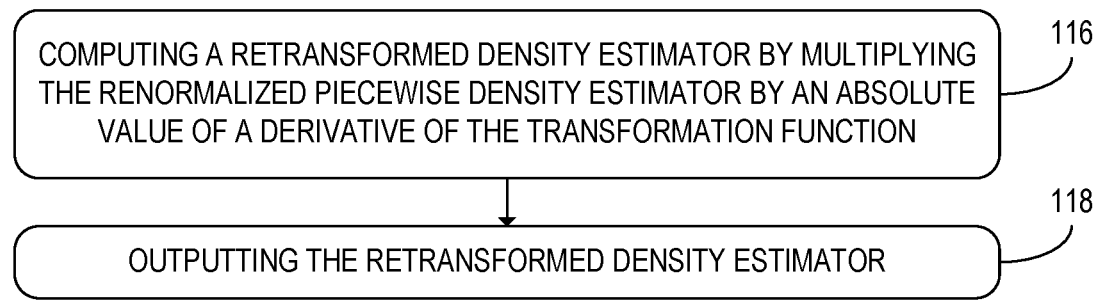

In some examples in which step 104 is performed, the method 100 may further include the steps shown in the example of FIG. 3C. At step 116, the method 100 may further include computing a retransformed density estimator $\hat{f}_X(x)$ of the original distribution $f_X(x)$ by multiplying the renormalized piecewise density estimator $\hat{f}_Y(y)$ by $|T'(x)|$, the absolute value of the derivative of the transformation function. In such examples, the method 100 may further include, at step 118, outputting the retransformed density estimator $\hat{f}_X(x)$. Thus, the density estimator may be output after having been converted back into the x domain.

Figure 4:
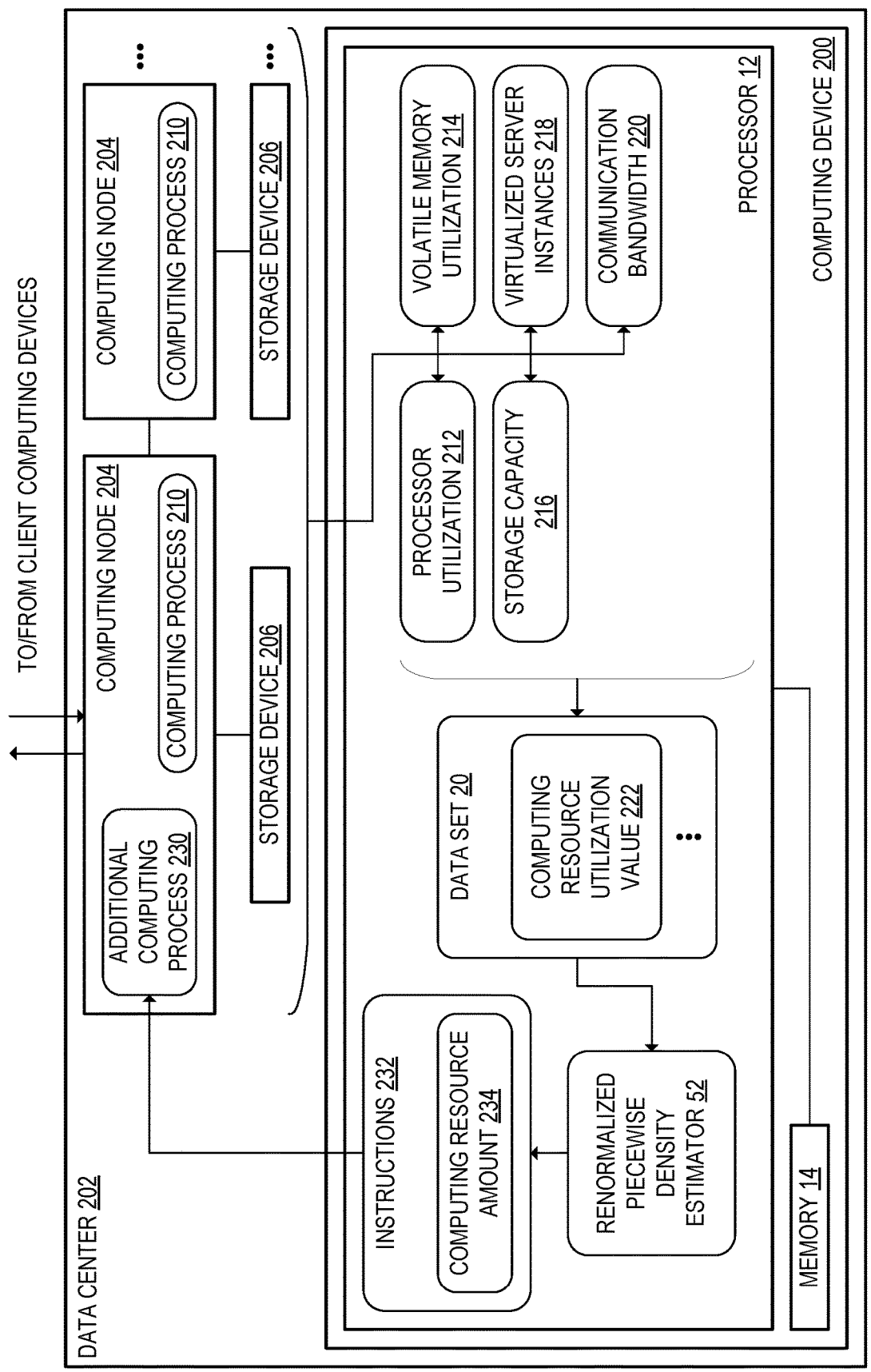
FIG. 4 shows an example computing device that is located in a data center and is configured to compute a renormalized piecewise density estimator for a plurality of computing resource utilization values, according to the embodiment of FIG. 1A.
Figure 5:
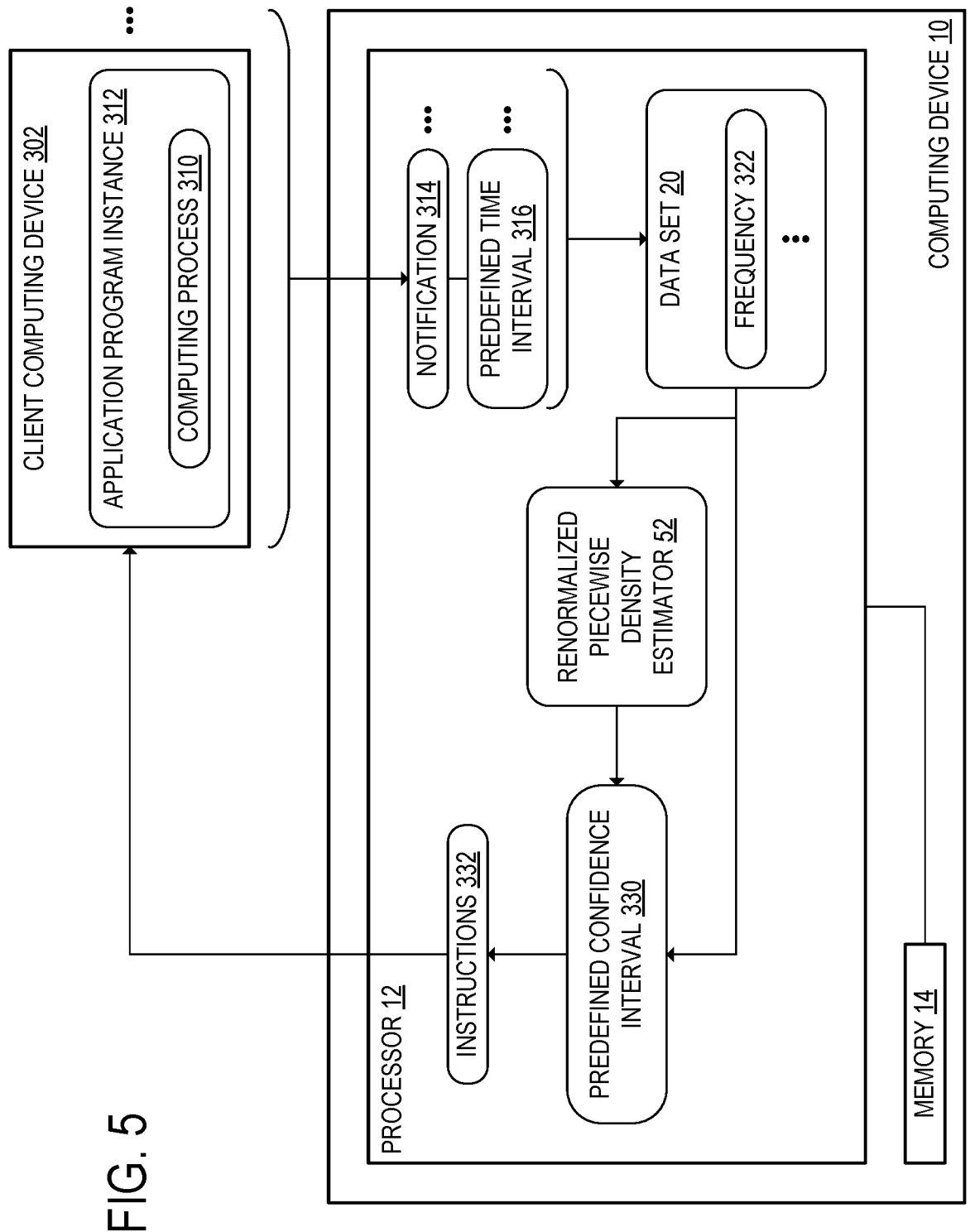
FIG. 5 shows the example computing device of FIG. 1A when the processor is configured to compute a renormalized piecewise density estimator for a plurality of frequencies with which notifications of a computing process are received from a plurality of client computing devices.

FIGS. 4 and 5 schematically show example computing environments in which the renormalized piecewise density estimator 52 may be provisioned when generating instructions for one or more computing devices. As shown in the example of FIG. 4, a renormalized piecewise density estimator 52 may be used when allocating computing resources in a data center 202. The data center 202 may include a plurality of computing nodes 204 configured to perform computations and a plurality of storage devices 206 configured to store data. The computing device 200 at which the renormalized piecewise density estimator 52 is computed may be a physical computing device coupled to one or more of the plurality of computing nodes 204. Alternatively, the computing device 200 may be a virtualized computing device instantiated on one or more of the plurality of computing nodes 200.

In the example of FIG. 4, the univariate data points 22 included in the data set 20 may be computing resource utilization values 222 for a computing resource used by a plurality of computing processes 210 executed at one or more of the computing nodes 204 of the data center 202. For example, the computing resource may be a processor utilization 212 or a volatile memory utilization 214 of one or more computing nodes 204, a storage capacity 216 of one or more of the storage devices 206, a number of virtualized server instances 218 instantiated at the one or more computing nodes 204, or a communication bandwidth 218 of communication between the one or more computing nodes 204 and one or more client computing devices located outside the data center 202. In other examples, computing resource utilization values 222 of other computing resources may be used as the univariate data points 22.

The computing resource utilization values 222 may be included in a historical data set, and the renormalized piecewise density estimator 52 generated from the computing resource utilization values 222 may be used to estimate utilization of the computing resource by future computing processes. Based at least in part on the renormalized piecewise density estimator 52 computed for the computing resource utilization values 222, the processor 12 may be configured to programmatically assign a computing resource amount 234 of the computing resource to a plurality of additional computing processes 230 executed at the one or more computing nodes 204. The computing resource amount 234 may be computed for the plurality of additional computing processes 230 as total amount that may be further divided between the additional computing processes 230 as the additional computing processes 230 are executed.

Since the renormalized piecewise density estimator 52 may be a more accurate estimate of the distribution of computing resource usage compared to estimators generated using existing methods, using the renormalized piecewise density estimator 52 may allow the computing resource to be allocated more efficiently. In addition, the data set 20 and the renormalized piecewise density estimator 52 may be updated to include computing resource utilization values 222 of the additional computing processes 230 when the additional computing processes 230 are performed. Thus, the estimates of computing resource utilization made using the renormalized piecewise density estimator 52 may become more accurate over time.

In the example of FIG. 5, the computing device 10 is a server computing device that communicates with a plurality of client computing devices 302. The univariate data points 22 included in the data set 20 may be frequencies 322 with which notifications 314 of a computing process 310 are received at the computing device 10 from a plurality of application program instances 312 executed on the client computing devices 302. The notification 314 of the computing process 310 may, for example, be an error notification, a request to download or upload a file, a login request, a modification to a setting of the application program instance 312, or a notification of some other computing process 310. For each client computing device 302, or for a plurality of samples that each include multiple client computing devices 302, the processor 12 may be configured to compute a frequency 322 in time with which the notifications 314 are received. In some examples, the processor 12 may be configured to compute the frequencies 322 for the client computing devices 302 within a plurality of predefined time intervals 316. The computed frequencies 322 may then be used as univariate data points 22 to compute the renormalized piecewise density estimator 52.

Based at least in part on the renormalized piecewise density estimator 52 computed for the plurality of frequencies 322, the processor 12 may be further configured to detect, for a specific predefined time interval 316 of the plurality of predefined time intervals 316, a frequency 322 outside a predefined confidence interval 330. For example, the predefined confidence interval 330 may be an interval of the renormalized piecewise density estimator 52 that is selected such that the respective frequencies of 95% of predefined time intervals 316 or 99% of predefined time intervals 316 fall within the confidence interval 330.

In response to detecting the frequency 322 outside the predefined confidence interval 330, the processor 12 may be further configured to programmatically transmit instructions 332 to modify the application program instances 312 to the plurality of client computing devices 302. For example, when the processor 12 receives error notifications with a frequency 322 outside the predefined confidence interval 330 after an update to the application program instances 312 has been performed, the processor 12 may be configured to generate instructions 332 to roll back the update and transmit those instructions 332 to the plurality of client computing devices 302. As another example, if a frequency 322 with which users of the application program instances 312 change a default setting of the application program to another non-default setting is above a threshold defined by the predefined confidence interval 330, the processor 12 may be configured to convey instructions 332 to the plurality of client computing devices 302 to make that non-default setting the new default setting for the application program. Thus, by using the renormalized piecewise density estimator 52 to detect atypical patterns of user interaction with the application program instances 302, the application program instances 312 may be updated more quickly to address errors introduced by updates or to adapt to typical use patterns.

Experimental results of the univariate density estimation method are shown in FIGS. 6-10B for a variety of reference distributions. In each of FIGS. 6-10B, the density estimated using the univariate density estimation method is plotted along with the density estimated using an optimally cross-validated Gaussian KDE. For each density distribution used in FIGS. 6-10B, a set of N=50000 samples were generated. The upper cutoff point and the lower cutoff point were selected as discussed above with $\alpha=0.025$.

Figure 6:
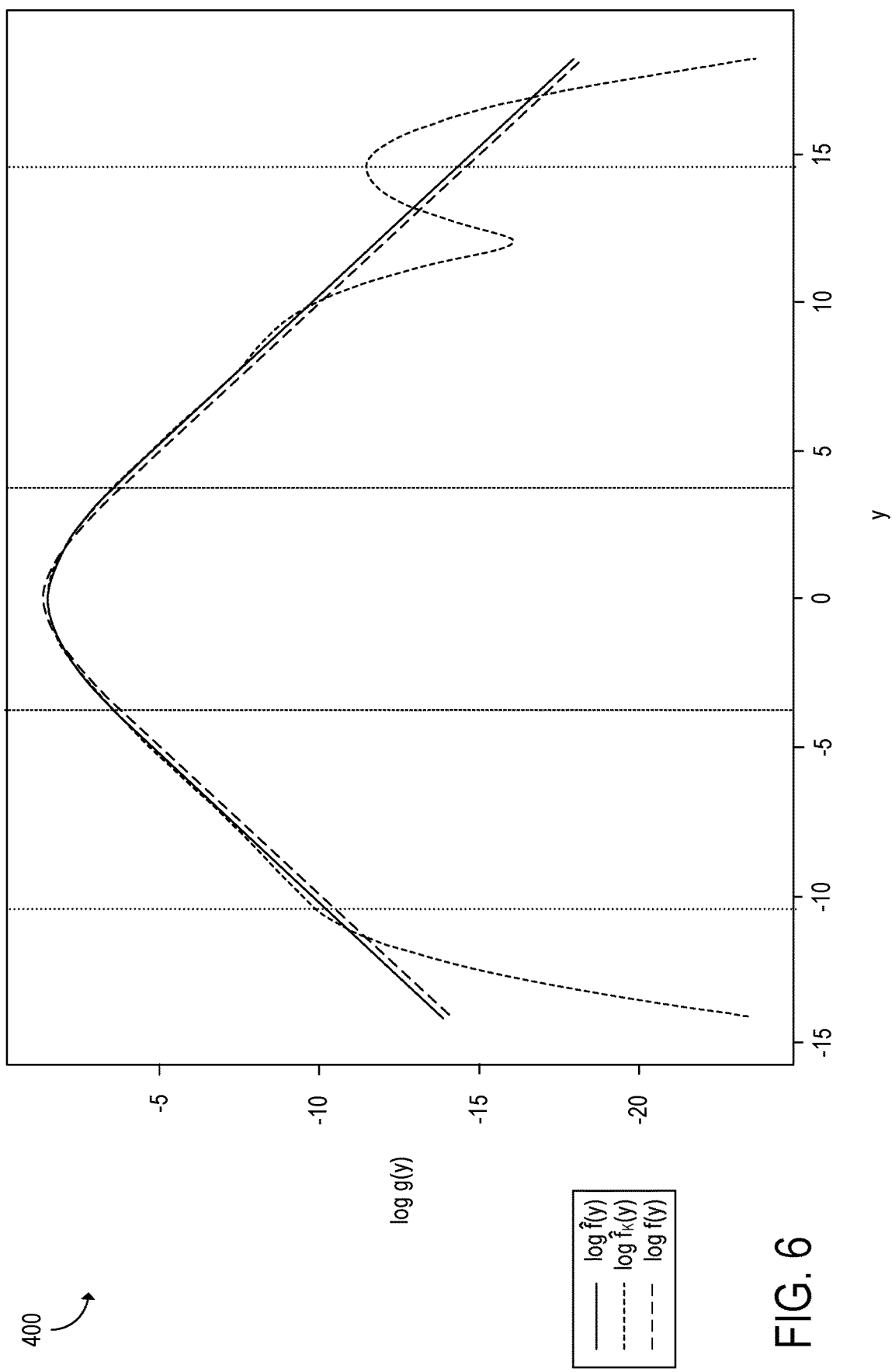
FIG. 6 shows an example plot of a true log density, an optimally cross-validated KDE log density, and a log density estimated according to the univariate density estimation method of FIG. 3A, in an example in which the distribution is a Pareto distribution.

In the example of FIG. 6, the sampled distribution is a Pareto distribution given by the following equation:

$$f_X(x;b) = bx^{-b-1}$$

where $0<b$ and $1 \leq x$. The transformation function is given by:

$$T(x) = \log(x-1)$$

This transformation function results in the transformed distribution $$f_Y(y;b) = be^{-by}$$

with $y \in \mathbb{R}$ when applied to $f_X(x; b)$. In the example of FIG. 6, b=1. FIG. 6 shows a plot 400 of the estimated log density log $\hat{f}(y)$, the optimally cross-validated KDE log density log $\hat{f}_K(y)$, and the true log density log f(y).

Figure 7A:
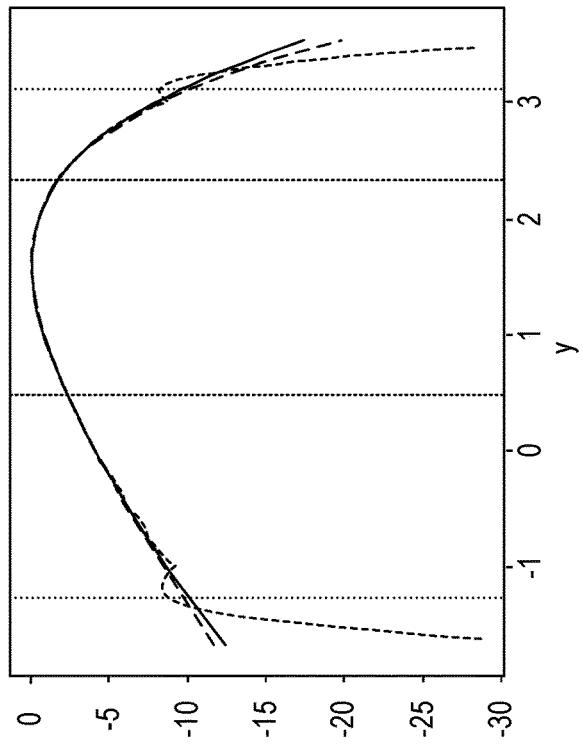
FIGS. 7A-7B show example plots of a true log density, an optimally cross-validated KDE log density, and a log density estimated according to the univariate density estimation method of FIG. 3A, in examples in which the distributions are gamma distributions.
Figure 7B:
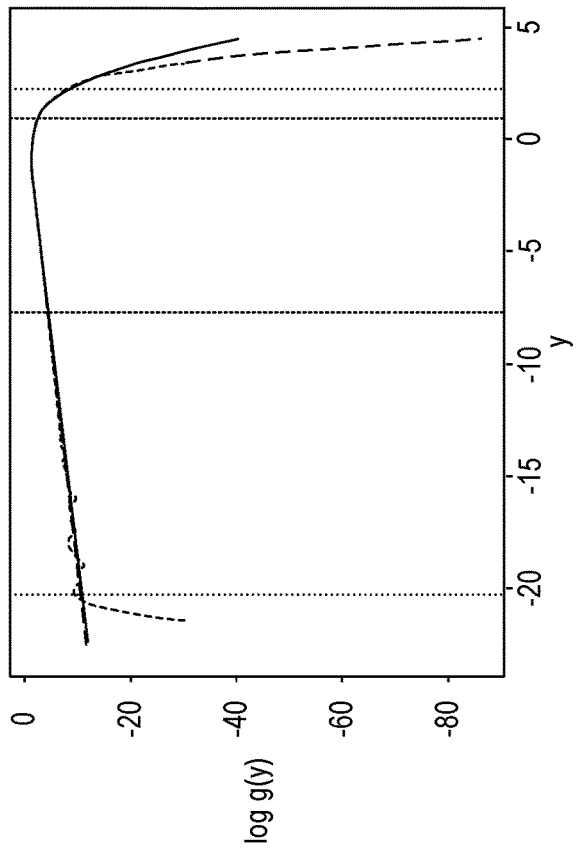

FIGS. 7A-7B respectively show plots 500A and 500B of the log densities log $\hat{f}(y)$, log $\hat{f}_K(y)$, and log f(y) for a first gamma distribution and a second gamma distribution. The first gamma distribution and the second gamma distribution are each given by the equation $$f_X(x;a) = \frac{x^{a-1}e^{-x}}{\Gamma(a)}$$

for $0<\alpha$ and $0<x$. The transformation function is given by the equation $$T(x) = \log(x)$$

Thus, the transformed distribution is given by the equation $$f_Y(y;a) = \frac{e^{ay-e^y}}{\Gamma(a)}$$

where $y \in \mathbb{R}$. In the example plot 500A of FIG. 7A, a=0.5, whereas in the example plot 500B of FIG. 7B, a=5.0.

Figures 8A, 8B:
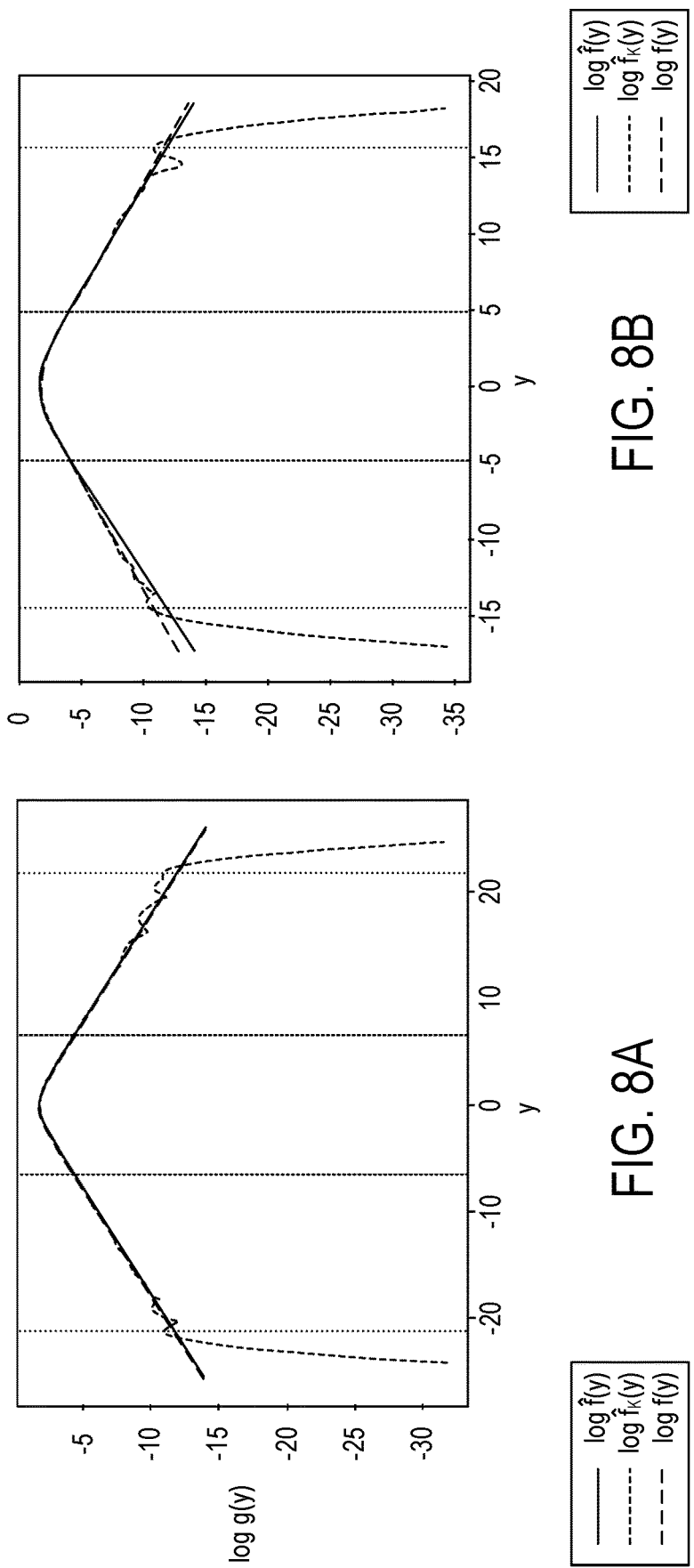
FIGS. 8A-8B show example plots of a true log density, an optimally cross-validated KDE log density, and a log density estimated according to the univariate density estimation method of FIG. 3A, in examples in which the distributions are beta distributions.

In FIGS. 8A-8B, a first example plot 600A and a second example plot 600B of the respective log densities log $\hat{f}(y)$, log $\hat{f}_K(y)$, and log f(y) of a first beta distribution and a second beta distribution are shown. The first beta distribution and the second beta distribution are each given by the equation $$f_X(x;a) = \frac{x^{a-1}(1-x)^{a-1}}{B(a,a)}$$

for $0<a$ and $0<x<1$. The transformation function is given by the equation $$T(x) = \log\frac{x}{1-x}$$

Thus, the transformed distribution is given by the equation $$f_Y(y) = \frac{e^{-ay}}{B(a,a)(1+e^{-y})^{2a}}$$

In the example plot 600A of FIG. 8A, a=0.5, whereas in the example plot 600B of FIG. 8B, a=0.7.

Figure 9:
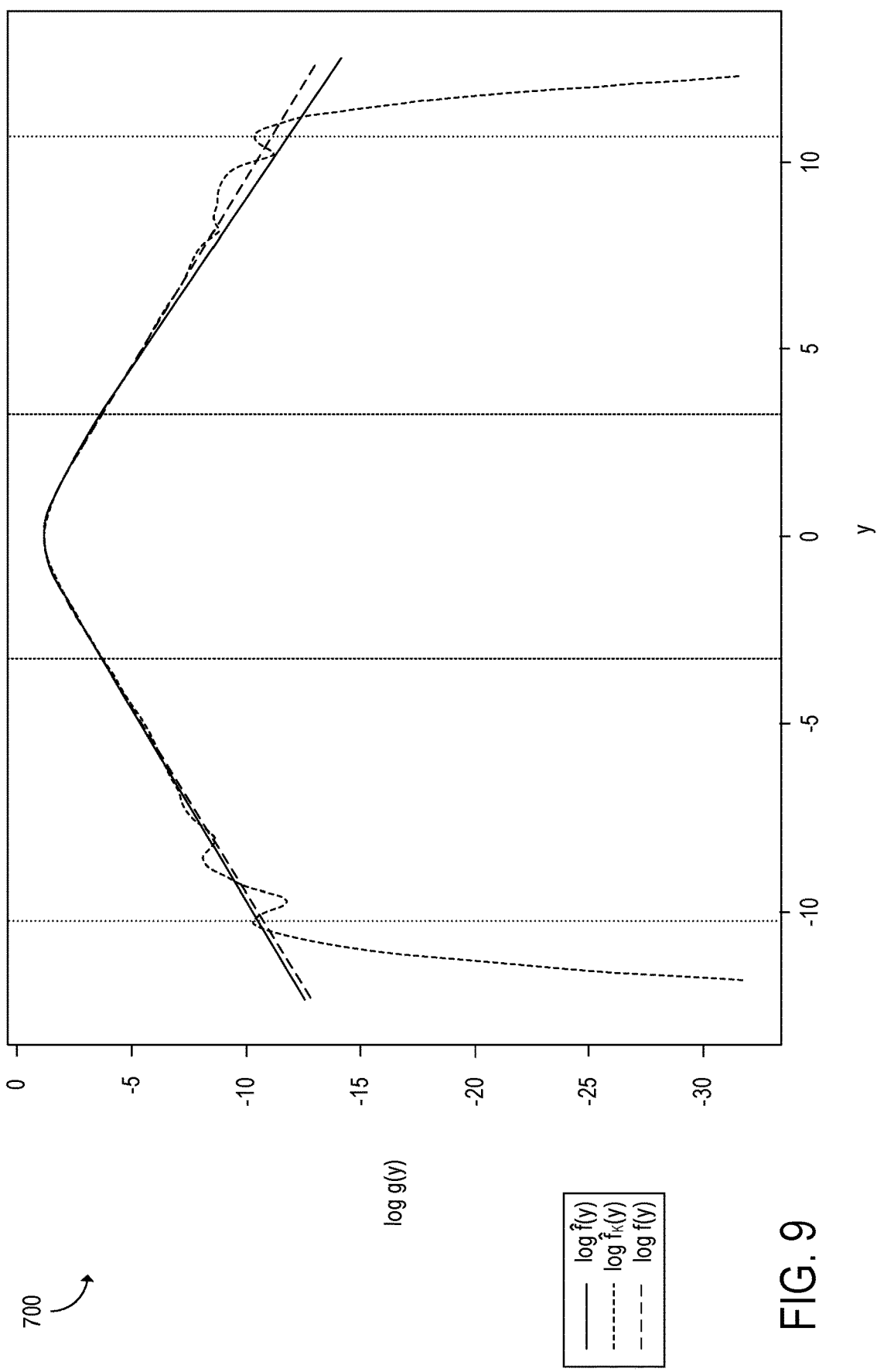
FIG. 9 shows an example plot of a true log density, an optimally cross-validated KDE log density, and a log density estimated according to the univariate density estimation method of FIG. 3A, in an example in which the distribution is a half-Cauchy distribution.

FIG. 9 shows an example plot 700 of the log densities log $\hat{f}(y)$, log $\hat{f}_K(y)$, and log f(y) for a half-Cauchy distribution. The half-Cauchy distribution is given by the equation $$f_X(x) = \frac{2}{\pi(1+x^2)}$$

for $0 \leq x$. The transformation function is given by the equation $$T(x) = \log(x)$$

Thus, the transformed distribution is given by the equation $$f_Y(y) = \frac{2}{\pi(e^y + e^{-y})}$$

Figures 10A, 10B:
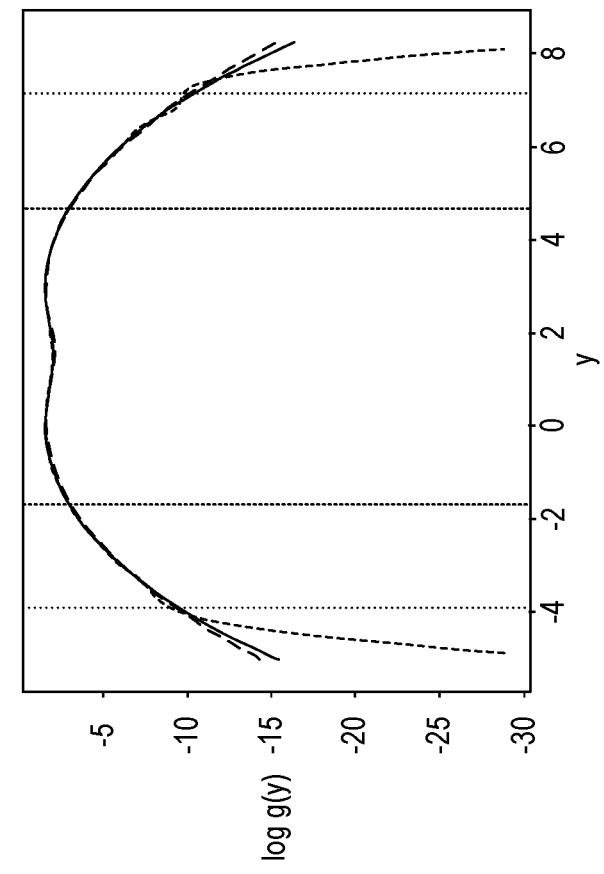
FIGS. 10A-10B show example plots of a true log density, an optimally cross-validated KDE log density, and a log density estimated according to the univariate density estimation method of FIG. 3A, in examples in which the distributions are Gaussian mixture distributions.

In FIGS. 10A-10B, a first example plot 800A and a second example plot 800B of the respective log densities log $\hat{f}(y)$, log $\hat{f}_K(y)$, and log f(y) of a first Gaussian mixture distribution and a second Gaussian mixture distribution are shown. The first Gaussian mixture distribution and the second Gaussian mixture distribution are each given by the equation $$f_X(x;\mu_0;\mu_1;p) = \frac{1}{\sqrt{2\pi}}\left[pe^{-\frac{1}{2}(x-\mu_0)^2} + (1-p)e^{-\frac{1}{2}(x-\mu_1)^2}\right]$$

for $x \in \mathbb{R}$. In the first example plot 800A of FIG. 10A, $\mu_0=0$ and $\mu_1=3$. In the second example plot 800B of FIG. 10B, $\mu_0=0$ and $\mu_1=10$. The transformation function in the example of FIGS. 10A-10B is the identity transformation function $$T(x) = x$$

Thus, the transformed distribution is equal to the original distribution:

$$f_Y(y) = f_X(y)$$

As shown in the above examples, the estimated log density log $\hat{f}(y)$ is closer to the true log density log f(y) than the optimally cross-validated KDE log density log $\hat{f}_K(y)$ for large portions of each tail region. In the above examples, the optimally cross-validated KDE log density log $\hat{f}_K(y)$ underestimates the density at the extreme ends of the tails by several orders of magnitude, whereas the estimated log density log $\hat{f}(y)$ obtained using the univariate density estimation method does not. Thus, in addition to a reduction in the computational cost of estimating the density of the distribution, the methods discussed above may result in more accurate density estimates.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
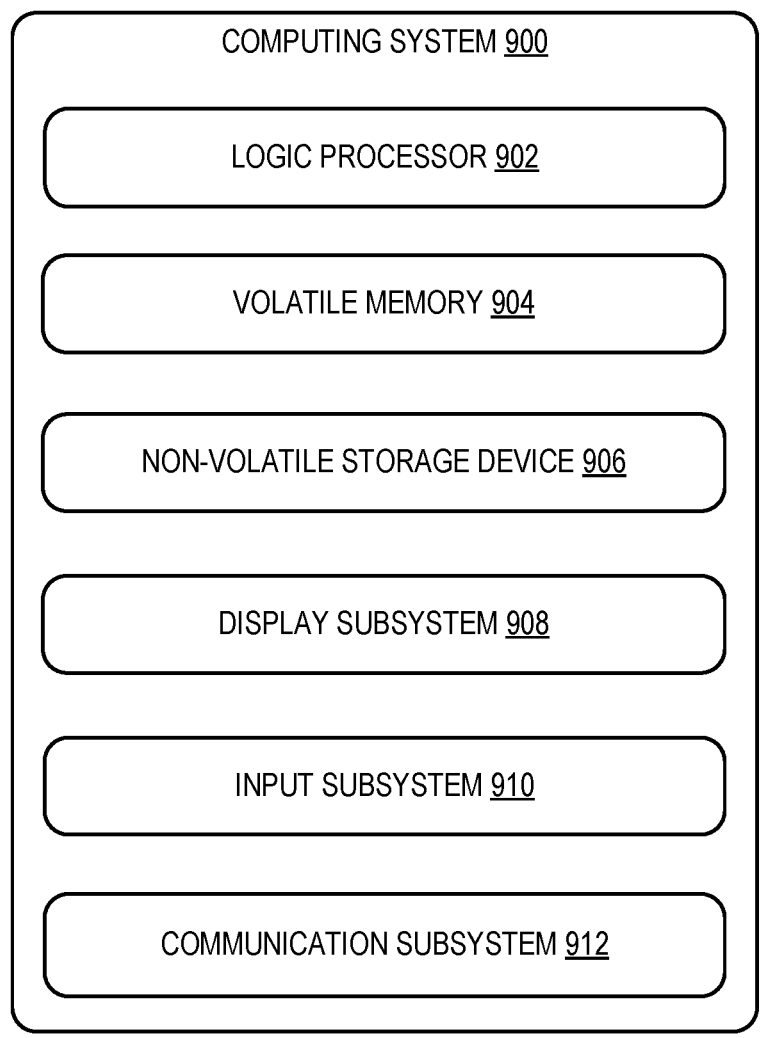
FIG. 11 shows a schematic view of an example computing environment in which the computing device of FIG. 1A may be included.

FIG. 11 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906.

Computing system 900 may optionally include a display subsystem 908, input subsystem 910, communication subsystem 912, and/or other components not shown in FIG. 11.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs describe several aspects of the present disclosure. According to one aspect of the present disclosure, a method for use with a computing device is provided. The method may include receiving a data set including a plurality of univariate data points. The method may further include determining a target kernel bandwidth for a kernel density estimator (KDE). Determining the target kernel bandwidth may include computing, for the data set, a plurality of sample KDEs with a respective plurality of candidate kernel bandwidths. Determining the target kernel bandwidth may further include selecting the target kernel bandwidth based at least in part on the sample KDEs. The method may further include computing the KDE for the data set using the target kernel bandwidth. For one or more tail regions of the data set, the method may further include computing one or more respective tail extensions. The method may further include computing a renormalized piecewise density estimator that, in each tail region of the one or more tail regions, equals a renormalization of the respective tail extension for that tail region, and outside the one or more tail regions, equals a renormalization of the KDE. The method may further include outputting the renormalized piecewise density estimator.

According to this aspect, the method may further include applying a transformation function to the univariate data points prior to determining the target kernel bandwidth.

According to this aspect, the method may further include computing a retransformed density estimator by multiplying the renormalized piecewise density estimator by an absolute value of a derivative of the transformation function. The method may further include outputting the retransformed density estimator.

According to this aspect, determining the target kernel bandwidth may further include performing gradient descent on respective a loss function for each candidate kernel bandwidth of the plurality of candidate kernel bandwidths.

According to this aspect, determining the target kernel bandwidth may include performing leave-one-out cross-validation at least in part by, for each candidate kernel bandwidth of the plurality of candidate kernel bandwidths, computing a plurality of leave-one-out density estimates with the candidate kernel bandwidth for the plurality of univariate data points. Performing leave-one-out cross-validation may further include evaluating the loss function based on the plurality of leave-one-out density estimates.

According to this aspect, the loss function may be a log loss function.

According to this aspect, the one or more tail regions may include a lower tail region including each univariate data point with a value below a lower cutoff value and an upper tail region including each univariate data point with a value above an upper cutoff value.

According to this aspect, for each tail extension of the one or more tail extensions, the tail extension may be equal to the KDE at a boundary of the tail region. A derivative of the tail extension may be equal to a derivative of the KDE at the boundary of the tail region.

According to this aspect, computing the one or more tail extensions may include, for each tail extension of the one or more tail extensions, estimating a maximum value of a log likelihood function of one or more tail extension parameters of the tail extension.

According to this aspect, the plurality of sample KDEs may be computed using a fast Gauss transform algorithm.

According to another aspect of the present disclosure, a computing device is provided, including a processor configured to receive a data set including a plurality of univariate data points. The processor may be further configured to determine a target kernel bandwidth for a kernel density estimator (KDE). Determining the target kernel bandwidth may include computing, for the data set, a plurality of sample KDEs with a respective plurality of candidate kernel bandwidths. Determining the target kernel bandwidth may further include selecting the target kernel bandwidth based at least in part on the sample KDEs. The processor may be further configured to compute the KDE for the data set using the target kernel bandwidth. For one or more tail regions of the data set, the processor may be further configured to compute one or more respective tail extensions. The processor may be further configured to compute a renormalized piecewise density estimator that, in each tail region of the one or more tail regions, equals a renormalization of the respective tail extension for that tail region, and outside the one or more tail regions, equals a renormalization of the KDE. The processor may be further configured to convey the renormalized piecewise density estimator for output.

According to this aspect, the processor may be further configured to apply a transformation function to the univariate data points prior to determining the target kernel bandwidth.

According to this aspect, the processor may be further configured to compute a retransformed density estimator by multiplying the renormalized piecewise density estimator by an absolute value of a derivative of the transformation function. The processor may be further configured to convey the retransformed density estimator for output.

According to this aspect, the processor may be configured to determine the target kernel bandwidth at least in part by performing gradient descent on respective a loss function for each candidate kernel bandwidth of the plurality of candidate kernel bandwidths.

According to this aspect, the one or more tail regions may include a lower tail region including each univariate data point with a value below a lower cutoff value and an upper tail region including each univariate data point with a value above an upper cutoff value.

According to this aspect, for each tail extension of the one or more tail extensions, the tail extension may be equal to the KDE at a boundary of the tail region, and a derivative of the tail extension may be equal to a derivative of the KDE at the boundary of the tail region.

According to this aspect, the plurality of sample KDEs may be computed using a fast Gauss transform algorithm.

According to this aspect, the univariate data points included in the data set may be computing resource utilization values for a computing resource used by a plurality of computing processes executed at one or more computing nodes of a data center. Based at least in part on the renormalized piecewise density estimator computed for the computing resource utilization values, the processor may be further configured to programmatically assign a computing resource amount of the computing resource to a plurality of additional computing processes executed at the one or more computing nodes.

According to this aspect, the univariate data points included in the data set may be frequencies, within a respective plurality of predefined time intervals, with which notifications of a computing process are received at the computing device from a plurality of application program instances executed on a respective plurality of client computing devices. The processor may be further configured to, based at least in part on the renormalized piecewise density estimator computed for the plurality of frequencies, detect, for a predefined time interval of the plurality of predefined time intervals, a frequency outside a predefined confidence interval. The processor may be further configured to, in response to detecting the frequency outside the predefined confidence interval, programmatically transmit instructions to modify the application program instances to the plurality of client computing devices.

According to another aspect of the present disclosure, a server computing device is provided, including a processor configured to receive, from a plurality of computing devices, a data set including a plurality of univariate data points. The processor may be further configured to determine a target kernel bandwidth for a kernel density estimator (KDE). Determining the target kernel bandwidth may include computing, for the data set, a plurality of sample KDEs with a respective plurality of candidate kernel bandwidths. Determining the target kernel bandwidth may further include selecting the target kernel bandwidth based at least in part on the sample KDEs. The processor may be further configured to compute the KDE for the data set using the target kernel bandwidth. For one or more tail regions of the data set, the processor may be further configured to compute one or more respective tail extensions. The processor may be further configured to compute a renormalized piecewise density estimator that, in each tail region of the one or more tail regions, equals a renormalization of the respective tail extension for that tail region, and outside the one or more tail regions, equals a renormalization of the KDE. Based on the renormalized piecewise density operator, the processor may be further configured to generate instructions for the plurality of computing devices. The processor may be further configured to convey the instructions for execution at the plurality of computing devices.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for use with a computing device, the method comprising:
   receiving a data set including a plurality of univariate data points;
   determining a target kernel bandwidth for a kernel density estimator (KDE), wherein determining the target kernel bandwidth includes:
      computing, for the data set, a plurality of sample KDEs with a respective plurality of candidate kernel bandwidths; and
      selecting the target kernel bandwidth based at least in part on the sample KDEs;
   computing the KDE for the data set using the target kernel bandwidth;
   for one or more tail regions of the data set, computing one or more respective tail extensions;
   computing a renormalized piecewise density estimator that:
      in each tail region of the one or more tail regions, equals a renormalization of the respective tail extension for that tail region; and
      outside the one or more tail regions, equals a renormalization of the KDE; and
   outputting the renormalized piecewise density estimator.

2. The method of claim 1, further comprising applying a transformation function to the univariate data points prior to determining the target kernel bandwidth.

3. The method of claim 2, further comprising:
   computing a retransformed density estimator by multiplying the renormalized piecewise density estimator by an absolute value of a derivative of the transformation function; and
   outputting the retransformed density estimator.

4. The method of claim 1, wherein determining the target kernel bandwidth further includes performing gradient descent on respective a loss function for each candidate kernel bandwidth of the plurality of candidate kernel bandwidths.

5. The method of claim 4, wherein determining the target kernel bandwidth includes performing leave-one-out cross-validation at least in part by, for each candidate kernel bandwidth of the plurality of candidate kernel bandwidths:
   computing a plurality of leave-one-out density estimates with the candidate kernel bandwidth for the plurality of univariate data points; and
   evaluating the loss function based on the plurality of leave-one-out density estimates.

6. The method of claim 5, wherein the loss function is a log loss function.

7. The method of claim 1, wherein the one or more tail regions include:
   a lower tail region including each univariate data point with a value below a lower cutoff value; and
   an upper tail region including each univariate data point with a value above an upper cutoff value.

8. The method of claim 1, wherein, for each tail extension of the one or more tail extensions:
   the tail extension is equal to the KDE at a boundary of the tail region; and
   a derivative of the tail extension is equal to a derivative of the KDE at the boundary of the tail region.

9. The method of claim 1, wherein computing the one or more tail extensions includes, for each tail extension of the one or more tail extensions, estimating a maximum value of a log likelihood function of one or more tail extension parameters of the tail extension.

10. The method of claim 1, wherein the plurality of sample KDEs are computed using a fast Gauss transform algorithm.

11. A computing device comprising:
   a processor configured to:
      receive a data set including a plurality of univariate data points;
      determine a target kernel bandwidth for a kernel density estimator (KDE), wherein determining the target kernel bandwidth includes:
         computing, for the data set, a plurality of sample KDEs with a respective plurality of candidate kernel bandwidths; and
         selecting the target kernel bandwidth based at least in part on the sample KDEs;
      compute the KDE for the data set using the target kernel bandwidth;
      for one or more tail regions of the data set, compute one or more respective tail extensions;
      compute a renormalized piecewise density estimator that:
         in each tail region of the one or more tail regions, equals a renormalization of the respective tail extension for that tail region; and outside the one or more tail regions, equals a renormalization of the KDE; and convey the renormalized piecewise density estimator for output.

12. The computing device of claim 11, wherein the processor is further configured to apply a transformation function to the univariate data points prior to determining the target kernel bandwidth.

13. The computing device of claim 12, wherein the processor is further configured to:
compute a retransformed density estimator by multiplying the renormalized piecewise density estimator by an absolute value of a derivative of the transformation function; and
convey the retransformed density estimator for output.

14. The computing device of claim 11, wherein the processor is configured to determine the target kernel bandwidth at least in part by performing gradient descent on respective a loss function for each candidate kernel bandwidth of the plurality of candidate kernel bandwidths.

15. The computing device of claim 11, wherein the one or more tail regions include:
a lower tail region including each univariate data point with a value below a lower cutoff value; and
an upper tail region including each univariate data point with a value above an upper cutoff value.

16. The computing device of claim 11, wherein, for each tail extension of the one or more tail extensions:
the tail extension is equal to the KDE at a boundary of the tail region; and
a derivative of the tail extension is equal to a derivative of the KDE at the boundary of the tail region.

17. The computing device of claim 11, wherein the plurality of sample KDEs are computed using a fast Gauss transform algorithm.

18. The computing device of claim 11, wherein:
the univariate data points included in the data set are computing resource utilization values for a computing resource used by a plurality of computing processes executed at one or more computing nodes of a data center; and
based at least in part on the renormalized piecewise density estimator computed for the computing resource utilization values, the processor is further configured to programmatically assign a computing resource amount of the computing resource to a plurality of additional computing processes executed at the one or more computing nodes.

19. The computing device of claim 11, wherein:
the univariate data points included in the data set are frequencies, within a respective plurality of predefined time intervals, with which notifications of a computing process are received at the computing device from a plurality of application program instances executed on a respective plurality of client computing devices; and
the processor is further configured to:
based at least in part on the renormalized piecewise density estimator computed for the plurality of frequencies, detect, for a predefined time interval of the plurality of predefined time intervals, a frequency outside a predefined confidence interval; and
in response to detecting the frequency outside the predefined confidence interval, programmatically transmit instructions to modify the application program instances to the plurality of client computing devices.

20. A server computing device comprising:
a processor configured to:
receive, from a plurality of computing devices, a data set including a plurality of univariate data points;
determine a target kernel bandwidth for a kernel density estimator (KDE), wherein determining the target kernel bandwidth includes:
computing, for the data set, a plurality of sample KDEs with a respective plurality of candidate kernel bandwidths; and
selecting the target kernel bandwidth based at least in part on the sample KDEs;
compute the KDE for the data set using the target kernel bandwidth;
for one or more tail regions of the data set, compute one or more respective tail extensions;
compute a renormalized piecewise density estimator that:
in each tail region of the one or more tail regions, equals a renormalization of the respective tail extension for that tail region; and
outside the one or more tail regions, equals a renormalization of the KDE;
based on the renormalized piecewise density operator, generate instructions for the plurality of computing devices; and
convey the instructions for execution at the plurality of computing devices.

* * * * *